[11] 3,627,400

[72] Inventor Henry John Caulfield
Carlisle, Mass.
[21] Appl. No. 79,578
[22] Filed Oct. 9, 1970
[45] Patented Dec. 14, 1971
[73] Assignee Sperry Rand Corporation

[54] ADDRESSING HOLOGRAPHIC APPARATUS FOR USE WITH SPACE DIVISION MULTIPLEXED HOLOGRAMS
4 Claims, 7 Drawing Figs.

[52] U.S. Cl. .......... 350/3.5
[51] Int. Cl. .......... G02b 27/00
[50] Field of Search .......... 350/3.5; 355/2; 340/173 LT, 173 SS, 173 MA

[56] References Cited
UNITED STATES PATENTS

| | | | |
|---|---|---|---|
| 3,519,322 | 7/1970 | Brooks et al. .......... | 350/3.5 |
| 3,567,305 | 3/1971 | Collier et al. .......... | 350/3.5 |

OTHER REFERENCES

Vitols, IBM Technical Disclosure Bulletin, Vol. 8, No. 11, Apr. 1966, pp. 1581–1583

*Primary Examiner*—David Schonberg
*Assistant Examiner*—Ronald J. Stern
*Attorney*—S. C. Yeaton

ABSTRACT: Holographic apparatus for addressing a space division multiplexed holographic storage medium having a plurality of holograms mutually interspersed and distributed over a given area, each hologram being recorded with a distinct sampling mask of a set of spatially complementary masks which are also used to construct the addressing holograms. Each addressing hologram is spatially distinct so as to be able to function individually in holographic reconstruction apparatus to direct substantially all the light in the reconstructing reference beam onto the discrete regions occupied by the particular multiplexed hologram recorded with the same mask as the operative addressing hologram.

INVENTOR
HENRY JOHN CAULFIELD
BY
H P Terry
ATTORNEY

INVENTOR
HENRY JOHN CAULFIELD
BY
H. Terry
ATTORNEY

ADDRESSING HOLOGRAPHIC APPARATUS FOR USE WITH SPACE DIVISION MULTIPLEXED HOLOGRAMS

BACKGROUND OF THE INVENTION

1. Field of the Invention

The present invention relates to holographic apparatus and more particularly to addressing holograms for use with space division multiplexed holograms of the type disclosed in U.S. Pat. application Ser. No. 79,412 filed concurrently herewith in the name of Henry John Caulfield and assigned to the instant assignee.

2. Description of the Prior Art

The above-noted patent application describes a multiplexed holographic recording technique wherein individual holographic interference patterns representative of various objects or different perspectives of a single object are mutually interspersed and distributed throughout a prescribed region of the recording medium by means of spatially complementary sampling masks appropriately positioned in the path of the object beam for each recording. Reconstruction of the multiplexed wave fronts recorded in the foregoing manner is accomplished simply by illuminating the full aperture of the recording medium. To assure, however, that only one image is reproduced at any instant, the sampling mask corresponding to the image desired to be reproduced must be included in the reconstruction apparatus. It will be appreciated that as a consequence of the light-blocking action of the sampling masks, the available light intensity is considerably diminished with a concomitant degradation of the image brightness. Accordingly, it is the principal object of the present invention to provide means for directing the reconstructing reference beam onto a space division multiplexed holographic recording medium of the aforedescribed type in such a way that a large fraction of the available light is used for image reproduction.

SUMMARY OF THE INVENTION

A preferred apparatus for constructing the addressing holograms of the present invention comprises a holographic plate positioned in the rear focal plane of a lens. Individual masks of a spatially complementary set of sampling masks are positioned adjacent the front side of the lens in the path of collimating light beam whereupon light propagating through the sampling points is focused on the plate coincident with a reference light beam angularly displaced from the axis of the focused beam. For each successive recording a different mask is positioned in front of the ends. In addition, a different region of the holographic plate is used for receiving the interfering focused and reference beams so that each addressing hologram is formed in a spatially distinct area.

Reconstruction of an image of a spatially sampled holographically recorded object utilizing the addressing holograms is accomplished as follows. The lens and addressing holographic plate retain essentially the same relative position as used for recording the addressing holograms and a space division multiplexed hologram, constructed as explained in the aforementioned patent application, is positioned on the front side of the lens at approximately the same position previously occupied by the sampling masks. A reference beam is then directed onto a discrete interference region of the addressing plate in a direction opposite to its recording direction with the result that a real image of the corresponding sampling mask is provided at the location of the space division multiplexed hologram. In this way, a large fraction of the light in the reference beam is concentrated on the spatially distributed regions of the multiplexed hologram corresponding to a particular recorded object and thus the brightness of the reproduced image is significantly improved.

DESCRIPTION OF THE PREFERRED EMBODIMENT

Figure 1:
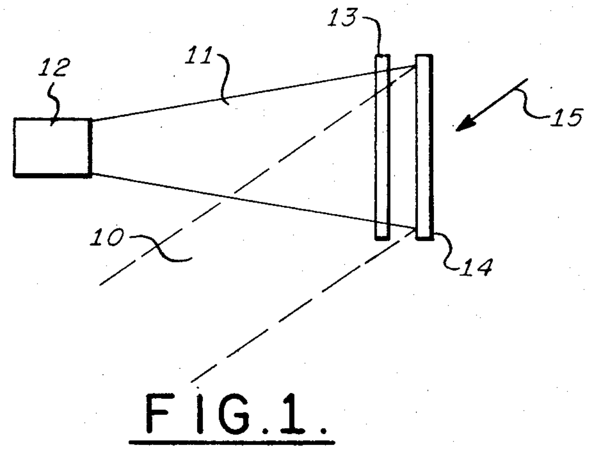
FIG. 1 is a schematic illustration of means for recording space division multiplexed holograms of the type described in the patent application referred to hereinbefore.

Before proceeding to a discussion of the addressing holograms of the present invention, the space division multiplexed holograms with which they are utilized will first be briefly described with reference to FIGS. 1 and 2. A more detailed description of the space division multiplexing technique can be found in the previously mentioned Caulfield patent application.

To construct the multiplexed hologram, a reference bean 10 and an object beam 11, reflected from a diffuse object 12, are propagated through a sampling mask 13 onto holographic recording medium 14 in superposed relation. As indicated in the drawing, the sampling mask must be reasonably close to the recording medium so that the pattern of the interference fringes formed thereon has substantially the same configuration as that of the sampling points on the respective masks. It is not essential that the reference beam also pass through the sampling mask, but as a consequence of the requirement for the mask to be close to the recording medium, it becomes necessary for all practical purposes to have both the object and reference beams transmitted through the mask.

Typical sampling masks are illustrated in FIGS. 2*a* to 2*d* wherein the light and dark shading represent respectively clear and opaque sections. These masks are constructed so as to be spatially complementary, that is, the transparent sections allocated to each mask are unique so that only one mask has a transparent section at any selected point within the areas of the masks. It will be understood, of course, that some overlap or pace sharing of sampling points can be tolerated without serious degradation of the image produced upon reconstruction. As a further limitation, the sampling points of each mask are preferably quasi-randomly distributed throughout the mask area. Thus, by using a selected mask for recording each scene the hologram thereof will be a unique spatially distributed interference pattern.

Playback or reconstruction of the recorded wave front to produce images of the objects is performed by removing the object and illuminating the recording medium 14 with only the reference beam which must be directed as indicated by arrow 15 to produce a real image. It will be readily apparent that if the reference beam illuminate the full aperture of the recording plate, all the recorded scenes will be imaged simultaneously in spatially superposed fashion with the result that the individual scenes may be obscured depending on the number and complexity thereof. An image of any single object desired to be presented for individual viewing an be obtained simply by inserting the corresponding sampling mask in the playback apparatus as explained in the aforementioned patent application. The mask can be positioned as shown in FIG. 1, or alternatively, can be positioned on the opposite side of the recording medium. The essential requirement is that the mask must be positioned so that only light from those points of the recording corresponding to a single scene is used to produce the image. In either case, whether the mask is to the front or rear of the recording medium, it will be appreciated that only a small fraction of the light intensity available in the reference beam will be utilized to form the image and consequently the image brightness will be diminished proportionately. To overcome this limitation, an addressing holographic technique is disclosed in accordance with the present invention whereby a large fraction of the available light intensity in the reference beam is utilized for producing each reconstructed image.

Figure 3:
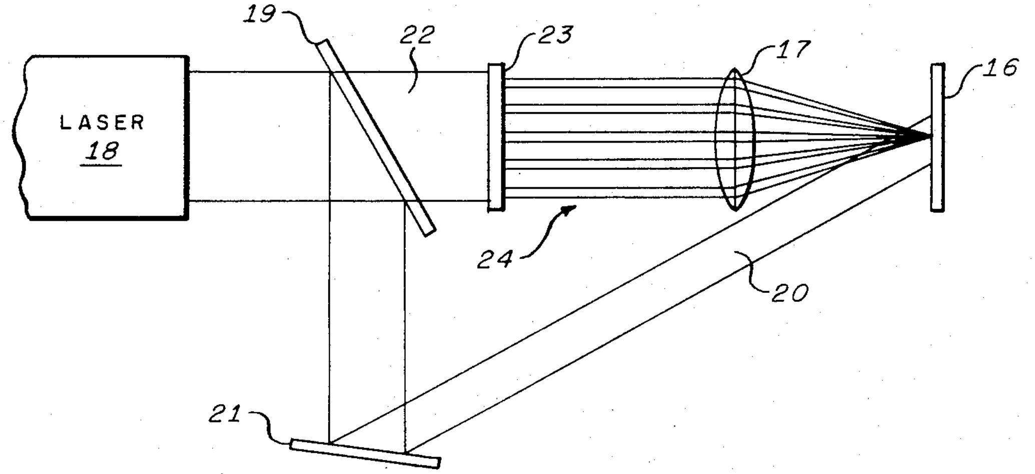
FIG. 3 is a schematic of apparatus for recording the addressing holograms of the present invention.

Construction of the addressing hologram is preferably accomplished as indicated in FIG. 3 by positioning a holographic recording plate 16 at the rear focal plane of a lens 17. A laser 18 emits a light beam directed at beam splitter 19 which divides the light into two beams, namely, reference beam 20 which is reflected from mirror 21 directly onto the holographic plate, and signal beam 22 which is propagated through the sampling mask 23 and then focused by lens 18 onto the holographic plate in coincidence with the reference beam. In the case where the sampling mask is placed close the the lens, the bundle of small light beams diffracted through the sampling mask will indeed remain spatially distinct as indicated in the drawing but it should be understood that this is not necessary for proper operation as will become apparent subsequently in connection with the description of the reconstruction apparatus. The holographic plate 16, on the other hand, is preferably located in the focal plane of the lens to obtain a Fourier transform hologram for optimized efficiency in the recording process, although slight displacement from the focal plane is tolerable.

In the process of constructing the respective addressing holograms, a different sampling mask is inserted in the path of the signal beam for each recording which is formed on a spatially distinct region of the holographic plate, for example by rotating the plate about an axis parallel to the lens axis so that the successive recordings are arrayed in an annular band. As previously explained in the brief description relating to the apparatus of the cited Caulfield patent application, each sampling mask corresponds to one of the spatially distributed holograms focused on the recording medium 14 of FIG. 1.

Figure 4:
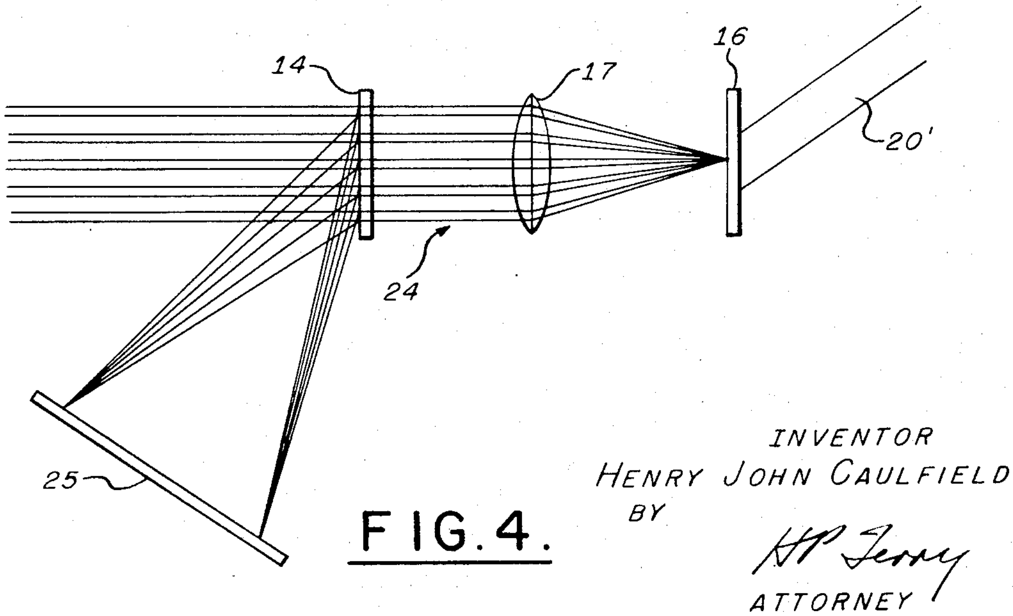
FIG. 4 is a schematic of reconstruction apparatus for producing images of enhanced brightness by means of the addressing holograms constructed in accordance with the technique illustrated in FIG. 3.
Figure 2A:
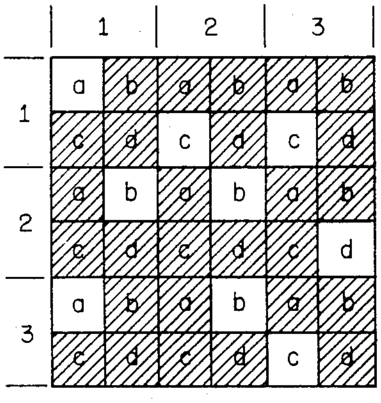
FIGS 2*a* to 2*d* depict spatially complementary sampling masks used in the apparatus of FIG. 1.
Figure 2B:
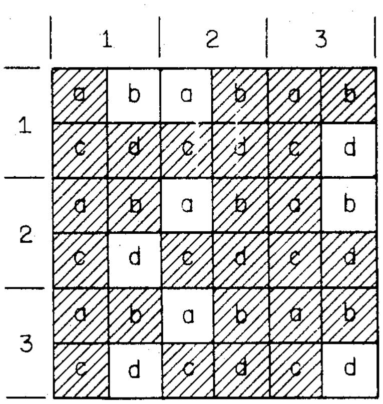
Figure 2C:
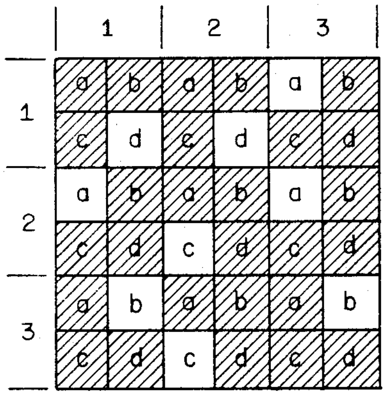
Figure 2D:
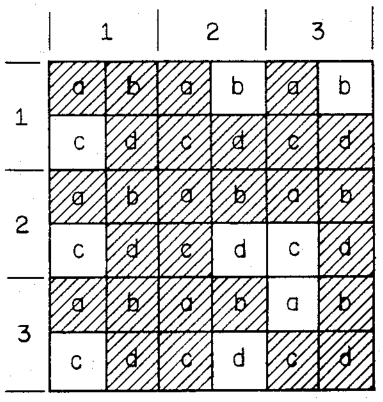

To produce an image corresponding to any one of the patterns recorded on medium 14, the addressing holographic plate is utilized in apparatus arranged as shown in FIG. 4 where the lens 17 and plate 16 have essentially the same spatial relation shown in FIG. 3. In this instance though a reference beam 20', having the same angle of incidence, wavelength and wave front curvature used to for recording the addressing holograms, is directed onto the back side of the addressing plate to produce a diverging array of light beams which are collected and collimated by the lens to produce the bundle of collimated beams 24 at the original location of the sampling masks whereat there is now positioned the multiplexed hologram 14 obtained with the apparatus of FIG. 1. Upon striking the multiplexed holograms 14, part of the energy in the collimated beams passes straight through constituting the zero order diffraction lobe while a substantial portion of the energy is concentrated in a first order diffracted beam to produce the desired real image at the location of screen 25. It will be noticed that the addressing hologram operates to reconstruct the bundle of beams diffracted through the sampling masks in the apparatus of FIG. 3. Hence, during the course of constructing the addressing holograms, the degree of spreading of the diffracted beams prior to impinging on the lens is inconsequential and therefore, as previously mentioned, relative placement of the lens and sampling masks is of no significance. During image reconstruction, however, utilizing the apparatus of FIG. 4, the spacing between the lens and the multiplexed hologram must be maintained the same as the spacing existing between the lens and sampling masks during the process of recording the addressing holograms in the absence of any provision for correcting magnification disparities.

Placement of a different addressing hologram in the path of the reference beam 20' will produce a different bundle of collimated beams corresponding to a related sampling mask and accordingly reconstruct the wave fronts of another of the space division multiplexed holograms. In any case, it should be understood that every part of the hologram will not necessarily contribute to every part of the image as appears to be indicated in FIG. 4. This will depend on the conditions attendant to the recording of the multiplexed holograms as is further explained in the previously mentioned patent application.

In some instances it may be considered advisable during reconstruction to position the related sampling mask in the path of the bundle of collimated beams intermediate the lens and space division multiplexed holograms, preferably immediately adjacent the latter, in the interest of reducing noise caused by the reconstructing collimated beams overlapping other wave front interference regions than the one desired to be reconstructed.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Apparatus for addressing a space division multiplexed hologram having a plurality of distinct holographic interference patterns recorded thereon, wherein each distinct pattern is recorded at a unique plurality of spatially separated portions of said hologram, the portions associated with any one distinct pattern being interspersed among the portions associated with any other distinct pattern and selectable by a sampling mask having transparent segments identical in size, shape, and location to said portions associated with one distinct pattern, said apparatus comprising:

an addressing hologram comprising a recording of a fringe pattern resulting from the interference of a coherent reference beam and a coherent beam modulated by said sampling mask, light source means for directing a beam of light onto said addressing hologram to produce a diffracted addressing beam representative of an image of said sampling masks, and light-focusing means disposed to collect said diffracted addressing beam and direct an image of said sampling mask onto said multiplexed hologram such that substantially all the energy in said addressing beam is concentrated on only one distinct interference pattern.

2. The apparatus of claim 1 wherein said fringe pattern is a Fourier transform hologram and said addressing hologram is located in a focal plane of said light-focusing means.

3. The apparatus of claim 2 wherein said focusing means is a lens.

4. The apparatus of claim 1 including additional addressing holograms each having a fringe pattern representative of a different sampling mask, each sampling mask corresponding to a different one of said plurality of distinct patterns, and wherein said light beam is directed onto a selected addressing hologram so as to address any selected distinct holographic interference pattern.

* * * * *